US012551825B2

(12) United States Patent
Rawls et al.

(10) Patent No.: US 12,551,825 B2
(45) Date of Patent: Feb. 17, 2026

(54) DRUM WASHER WITH GRAVITY ASSIST DRAINAGE

(71) Applicant: Andritz Inc., Alpharetta, GA (US)

(72) Inventors: Lindsay Brandino Rawls, Alpharetta, GA (US); Todd S. Grace, Alpharetta, GA (US)

(73) Assignee: ANDRITZ INC., Alpharetta, GA (US)

( * ) Notice: Subject to any disclaimer, the term of this patent is extended or adjusted under 35 U.S.C. 154(b) by 405 days.

(21) Appl. No.: 18/204,839

(22) Filed: Jun. 1, 2023

(65) Prior Publication Data

US 2023/0302384 A1    Sep. 28, 2023

Related U.S. Application Data

(63) Continuation-in-part of application No. 16/438,732, filed on Jun. 12, 2019, now abandoned.
(Continued)

(51) Int. Cl.
*B01D 33/74* (2006.01)
*B01D 33/067* (2006.01)
(Continued)

(52) U.S. Cl.
CPC ......... *B01D 33/742* (2013.01); *B01D 33/067* (2013.01); *B01D 33/073* (2013.01);
(Continued)

(58) Field of Classification Search
None
See application file for complete search history.

(56) References Cited

U.S. PATENT DOCUMENTS 770,307 A  *  9/1904  Parker ....................... D21F 1/60
                                                    162/335
811,660 A  *  2/1906  Parker ....................... D21F 1/60
                                                    162/335
(Continued)

FOREIGN PATENT DOCUMENTS

DE          3616201 A1  * 11/1987  ............. B01D 33/23
GB          715251 A       9/1954

OTHER PUBLICATIONS

"Office Action", issued by the Canadian Intellectual Property Office for application No. CA3,047,267 on Dec. 14, 2023, 3 pages.
(Continued)

*Primary Examiner* — Robert J Popovics
(74) *Attorney, Agent, or Firm* — Kilpatrick Townsend & Stockton LLP (57) ABSTRACT

A rotary drum filter includes a drum shell configured to rotate through a slurry, the drum shell having areas defining a plurality of drainage holes, at least one divider plate a first end and a second end, the at least one divider plate disposed on an outer surface of the drum shell and extending longitudinally and laterally along the drum shell, the first end being disposed near a drainage hole, and a filter medium disposed on one or more grids that are disposed on the outer surface of the drum shell above the at least one divider plate. The at least one divider plate is configured to direct filtrate on the outer surface of the drum shell filtered through the filter medium into the drainage hole.

9 Claims, 7 Drawing Sheets

Related U.S. Application Data (60) Provisional application No. 62/687,381, filed on Jun. 20, 2018.

(51) Int. Cl.
  *B01D 33/073* (2006.01)
  *D21C 9/18* (2006.01)

(52) U.S. Cl.
  CPC ............. *B01D 33/745* (2013.01); *D21C 9/18* (2013.01); *B01D 2201/204* (2013.01); *B01D 2201/282* (2013.01)

(56) References Cited

U.S. PATENT DOCUMENTS

| | | | | |
|---|---|---|---|---|
| 828,715 A * | 8/1906 | Cook | B01D 29/111 | 166/234 |
| 854,972 A * | 5/1907 | Wade | B01D 33/09 | 210/395 |
| 917,305 A * | 4/1909 | Johnson | B01D 33/04 | 210/402 |
| RE14,214 E * | 11/1916 | Akins | | 210/393 |
| 1,223,245 A * | 4/1917 | Biesel | B01D 33/09 | 210/395 |
| 1,344,747 A * | 6/1920 | Wright | B01D 33/0384 | 209/397 |
| 1,468,875 A * | 9/1923 | Clarke | D21D 5/06 | 210/402 |
| 1,558,038 A * | 10/1925 | Mount | B01D 33/463 | 210/393 |
| 1,561,632 A * | 11/1925 | Woodward | B07B 1/469 | 209/397 |
| 1,590,401 A * | 6/1926 | Wright | B01D 33/09 | 210/402 |
| 1,816,132 A * | 7/1931 | Strindlund | D21F 9/04 | 210/402 |
| 1,840,101 A * | 1/1932 | Jespersen | D21F 1/0009 | 73/434 |
| 1,859,642 A * | 5/1932 | Woodworth | B01D 33/09 | 210/395 |
| 1,892,306 A * | 12/1932 | Hillier | B01D 33/09 | 210/395 |
| 2,134,703 A * | 11/1938 | Cobb | C22B 1/10 | 210/402 |
| 2,167,159 A * | 7/1939 | Oliver | B01D 33/466 | 210/392 |
| 2,259,235 A * | 10/1941 | Weiss | B01D 33/09 | 210/402 |
| 2,263,189 A * | 11/1941 | Peterson | B01D 33/06 | 52/249 |
| 2,285,894 A * | 6/1942 | Brooks | B01D 33/067 | 210/404 |
| 2,289,762 A * | 7/1942 | Duvall | B01D 33/09 | 210/791 |
| 2,352,340 A * | 6/1944 | Oswald | B01D 33/466 | 29/896.62 |
| 2,362,300 A * | 11/1944 | Nyman | B01D 33/466 | 210/395 |
| 2,472,558 A * | 6/1949 | Ackerly, Jr. | B01D 33/067 | 210/402 |
| 2,534,161 A * | 12/1950 | Collins | B01D 33/09 | 210/402 |
| 2,537,414 A * | 1/1951 | Lindblad | D21F 1/66 | 162/357 |
| 2,582,273 A * | 1/1952 | Peterson | B01D 33/067 | 210/404 |
| 2,652,588 A * | 9/1953 | Harris | A22C 29/046 | 452/15 |
| 2,696,309 A * | 12/1954 | Bultman | B01D 33/09 | 162/335 |
| 2,724,507 A * | 11/1955 | Cataldo | B01D 33/073 | 99/425 |
| 2,732,080 A * | 1/1956 | Strindlund | B01D 33/073 | 210/402 |
| 2,741,369 A * | 4/1956 | Fest | B01D 33/09 | 210/392 |
| 2,755,938 A * | 7/1956 | Alcock | B01D 33/09 | 210/392 |
| 2,765,085 A * | 10/1956 | Strindlund | B01D 33/74 | 210/402 |
| 2,765,086 A * | 10/1956 | Strindlund | B01D 33/74 | 210/217 |
| 2,889,931 A * | 6/1959 | Buttolph | C07C 7/14 | 210/395 |
| 2,910,183 A * | 10/1959 | Hayes | B01D 33/11 | 210/315 |
| 2,963,158 A * | 12/1960 | Jung | B01D 33/70 | 210/174 |
| 3,014,589 A * | 12/1961 | Frykhult | B01D 33/09 | 210/123 |
| 3,027,011 A * | 3/1962 | Flynn | B01D 33/466 | 210/404 |
| 3,096,280 A * | 7/1963 | Davis | B01D 33/09 | 210/406 |
| 3,100,928 A | 8/1963 | Bryand | | |
| 3,105,043 A | 9/1963 | Rich et al. | | |
| 3,125,514 A * | 3/1964 | Frykhult | B01D 33/465 | 210/396 |
| 3,150,082 A * | 9/1964 | Rich | D21F 1/60 | 210/395 |
| 3,150,083 A * | 9/1964 | Luthi | B01D 33/82 | 210/404 |
| 3,175,691 A * | 3/1965 | Watson | B01D 33/067 | 210/404 |
| 3,220,554 A * | 11/1965 | Schiphorst | B01D 33/82 | 210/395 |
| 3,225,935 A * | 12/1965 | Porteous | B01D 33/067 | 210/404 |
| 3,235,086 A * | 2/1966 | Krynski | B01D 33/067 | 210/404 |
| 3,259,961 A | 7/1966 | Bryand | | |
| 3,275,155 A * | 9/1966 | Tell | D21F 1/66 | 210/404 |
| 3,306,457 A * | 2/1967 | Putnam | B01D 33/067 | 210/330 |
| 3,306,460 A * | 2/1967 | Luthi | B01D 33/82 | 210/404 |
| 3,323,654 A * | 6/1967 | Lee | B01D 33/465 | 210/406 |
| 3,327,862 A * | 6/1967 | Carlsmith | B01D 33/06 | 210/392 |
| 3,327,863 A * | 6/1967 | Turner, Jr. | B01D 33/073 | 210/392 |
| 3,342,124 A * | 9/1967 | Frykhult | B01D 33/466 | 100/157 |
| 3,363,774 A * | 1/1968 | Luthi | B01D 33/09 | 210/406 |
| 3,386,584 A * | 6/1968 | Luthi | D21F 1/66 | 210/404 |
| 3,487,941 A * | 1/1970 | Haapamaki | D21C 9/06 | 210/404 |
| 3,517,818 A * | 6/1970 | Luthi | B01D 33/073 | 210/392 |
| 3,561,603 A * | 2/1971 | Salomon | D21D 5/02 | 210/415 |
| 3,587,863 A * | 6/1971 | Kristofl | B01D 33/073 | 210/404 |
| 3,590,453 A | 7/1971 | Bryand | | |
| 3,667,614 A * | 6/1972 | Komline | B01D 33/09 | 210/401 |
| 3,680,708 A * | 8/1972 | Luthi | D21F 1/60 | 210/404 |
| 3,773,614 A | 11/1973 | Pennington | | |
| 3,775,234 A | 11/1973 | Rich | | |
| 3,781,957 A * | 1/1974 | Luthi | D21F 5/02 | 492/32 |
| 3,794,178 A * | 2/1974 | Luthi | B01D 33/067 | 210/404 |

(56) References Cited

U.S. PATENT DOCUMENTS

| | | | | |
|---|---|---|---|---|
| 3,825,124 A * | 7/1974 | Davis | B01D 33/27 | |
| | | | 210/402 | |
| 3,829,360 A | 8/1974 | Holz | | |
| 3,837,499 A * | 9/1974 | Luthi | B01D 33/09 | |
| | | | 210/404 | |
| 3,890,235 A | 6/1975 | Davis | | |
| 3,894,899 A * | 7/1975 | Konopatov | B01D 33/09 | |
| | | | 210/404 | |
| 3,954,622 A * | 5/1976 | Kus | B01D 33/09 | |
| | | | 29/896.62 | |
| 3,957,087 A * | 5/1976 | Johnston | E02B 11/005 | |
| | | | 138/175 | |
| 3,962,091 A * | 6/1976 | Doria | B01D 33/067 | |
| | | | 210/402 | |
| 4,001,119 A * | 1/1977 | Hunter | B01D 33/09 | |
| | | | 210/402 | |
| 4,038,187 A * | 7/1977 | Saffran | B01D 33/067 | |
| | | | 210/411 | |
| 4,066,555 A * | 1/1978 | Pascale | B01D 33/067 | |
| | | | 210/402 | |
| 4,101,374 A * | 7/1978 | Nebel | D21F 9/046 | |
| | | | 162/371 | |
| 4,133,379 A | 1/1979 | Nuzman et al. | | |
| 4,146,428 A | 3/1979 | Holz | | |
| 4,157,301 A * | 6/1979 | Wegener | B01D 33/09 | |
| | | | 210/404 | |
| 4,276,169 A * | 6/1981 | Browne | B01D 33/09 | |
| | | | 210/406 | |
| 4,297,794 A * | 11/1981 | Luthi | D21F 5/182 | |
| | | | 34/115 | |
| 4,308,143 A * | 12/1981 | Harkins, Jr. | B01D 33/067 | |
| | | | 210/402 | |
| 4,309,288 A * | 1/1982 | Ryan | B01D 33/13 | |
| | | | 210/395 | |
| 4,370,231 A * | 1/1983 | LaValley | B01D 33/465 | |
| | | | 210/406 | |
| 4,383,877 A * | 5/1983 | LaValley | B01D 33/06 | |
| | | | 210/402 | |
| 4,401,564 A * | 8/1983 | Epper | B01D 33/06 | |
| | | | 210/150 | |
| 4,419,165 A * | 12/1983 | LaValley | B01D 33/06 | |
| | | | 210/402 | |
| 4,454,042 A * | 6/1984 | Dorcheus | B01D 33/073 | |
| | | | 210/402 | |
| 4,551,248 A * | 11/1985 | Lenac | B01D 33/09 | |
| | | | 210/406 | |
| 4,581,139 A * | 4/1986 | Kosonen | B01D 33/073 | |
| | | | 162/335 | |
| 4,619,737 A | 10/1986 | Holz | | |
| 4,663,040 A * | 5/1987 | Elizondo | B01D 33/067 | |
| | | | 210/402 | |
| 4,680,115 A * | 7/1987 | LaValley | B01D 33/742 | |
| | | | 162/335 | |
| 4,795,560 A * | 1/1989 | Chupka | B23K 26/40 | |
| | | | 162/251 | |
| 4,816,169 A | 3/1989 | LaValley | | |
| 4,885,090 A * | 12/1989 | Chupka | B23K 31/025 | |
| | | | 162/251 | |
| 4,906,364 A * | 3/1990 | Luthi | B01D 33/09 | |
| | | | 210/381 | |
| 4,919,158 A * | 4/1990 | Kokkonen | D21C 9/06 | |
| | | | 210/216 | |
| 5,021,126 A | 6/1991 | Gwin et al. | | |
| 5,046,338 A * | 9/1991 | Luthi | D21C 9/06 | |
| | | | 68/43 | |
| 5,064,537 A * | 11/1991 | Chupka | B23K 26/384 | |
| | | | 162/251 | |
| 5,116,423 A * | 5/1992 | Kokkonen | D21C 9/06 | |
| | | | 210/216 | |
| 5,160,434 A * | 11/1992 | Heino | B01D 33/09 | |
| | | | 210/402 | |
| 5,244,572 A * | 9/1993 | McAllister | B01D 33/073 | |
| | | | 210/402 | |
| 5,281,343 A * | 1/1994 | Lewis | D21F 9/043 | |
| | | | 162/368 | |
| 5,308,488 A * | 5/1994 | Nelson | B01D 33/067 | |
| | | | 210/406 | |
| 5,460,019 A * | 10/1995 | Ojala | B01D 33/09 | |
| | | | 68/43 | |
| 5,480,545 A * | 1/1996 | Lewis | B01D 33/09 | |
| | | | 162/368 | |
| 5,503,737 A * | 4/1996 | Luthi | B01D 33/82 | |
| | | | 210/138 | |
| 5,566,611 A * | 10/1996 | Scheucher | B30B 9/18 | |
| | | | 100/297 | |
| 5,674,396 A * | 10/1997 | Wenzl | B01D 33/463 | |
| | | | 210/402 | |
| 5,683,582 A * | 11/1997 | Luthi | B01D 33/74 | |
| | | | 210/429 | |
| 6,004,468 A * | 12/1999 | Barbulescu | B01D 33/663 | |
| | | | 34/399 | |
| 6,006,554 A * | 12/1999 | Gallagher | D21C 9/06 | |
| | | | 210/429 | |
| 6,906,227 B2 | 6/2005 | Neumann et al. | | |
| 7,264,422 B2 | 9/2007 | Hasselbach et al. | | |
| 7,285,180 B2 * | 10/2007 | Sicley | D21F 1/78 | |
| | | | 162/357 | |
| 7,293,659 B2 * | 11/2007 | Grace | B01D 33/74 | |
| | | | 210/402 | |
| 7,347,916 B2 * | 3/2008 | Grace | B07B 1/22 | |
| | | | 210/402 | |
| 7,374,050 B2 * | 5/2008 | Grace | B01D 33/09 | |
| | | | 210/489 | |
| 7,575,658 B2 * | 8/2009 | Grace | D21C 9/06 | |
| | | | 134/119 | |
| 7,678,283 B2 * | 3/2010 | Grace | B01D 33/09 | |
| | | | 210/791 | |
| 7,780,815 B2 * | 8/2010 | Grace | D21C 9/18 | |
| | | | 162/13 | |
| 7,807,060 B2 * | 10/2010 | Schmid | B01D 33/044 | |
| | | | 210/791 | |
| 7,981,248 B2 * | 7/2011 | Grace | D21C 9/18 | |
| | | | 162/60 | |
| 8,137,568 B2 * | 3/2012 | Rouillard | B01D 33/067 | |
| | | | 210/402 | |
| 8,281,936 B2 * | 10/2012 | Grace | B01D 33/073 | |
| | | | 210/402 | |
| 8,556,087 B2 * | 10/2013 | Andersson | D21C 9/06 | |
| | | | 210/402 | |
| 9,511,311 B2 * | 12/2016 | Bugg | B01D 33/073 | |
| 9,551,430 B2 * | 1/2017 | Grace | B01D 36/001 | |
| 9,669,337 B2 * | 6/2017 | Giasson | B01D 33/067 | |
| 9,803,319 B2 * | 10/2017 | Hallas | D21C 9/02 | |
| 10,035,088 B2 * | 7/2018 | Merchel, III | B01D 33/073 | |
| 10,328,368 B2 * | 6/2019 | Grace | B01D 33/48 | |
| 10,427,073 B2 * | 10/2019 | Bitsch-Larsen | B01D 33/067 | |
| 10,589,201 B2 * | 3/2020 | Larsson | B01D 33/21 | |
| 10,729,994 B2 * | 8/2020 | Svensson | C02F 1/001 | |
| 10,843,230 B2 * | 11/2020 | Wojciechowski | B07B 1/4654 | |
| 10,857,490 B2 * | 12/2020 | Bartos | B01D 33/09 | |
| 10,870,073 B2 | 12/2020 | Knobloch et al. | | |
| 10,888,807 B2 * | 1/2021 | Harden | B01D 33/21 | |
| 10,946,318 B2 * | 3/2021 | Thysell | B01D 33/82 | |
| 11,633,681 B2 * | 4/2023 | Grace | B01D 35/02 | |
| | | | 55/497 | |
| 11,707,766 B2 * | 7/2023 | Colgrove | B07B 1/4618 | |
| | | | 210/808 | |
| 11,890,563 B2 * | 2/2024 | Walk | F16B 2/22 | |
| 11,980,837 B2 * | 5/2024 | Sundström | B01D 33/067 | |
| 12,128,335 B2 * | 10/2024 | Persson | B01D 33/073 | |
| 12,138,661 B2 * | 11/2024 | Colgrove | B01D 29/925 | |
| 12,453,933 B2 * | 10/2025 | Faivre | B01D 33/463 | |
| 2002/0008061 A1 | 1/2002 | Kossik et al. | | |
| 2005/0051473 A1 * | 3/2005 | Suss | B01D 33/09 | |
| | | | 210/345 | |
| 2005/0236339 A1 * | 10/2005 | Grace | B01D 33/067 | |
| | | | 210/791 | |

(56) References Cited

U.S. PATENT DOCUMENTS

| | | | | |
|---|---|---|---|---|
| 2006/0065378 | A1* | 3/2006 | Grace | D21C 9/06 134/119 |
| 2007/0012613 | A1* | 1/2007 | Grace | B01D 33/073 210/404 |
| 2007/0151920 | A1* | 7/2007 | Kay | B01D 46/10 210/500.1 |
| 2007/0210015 | A1* | 9/2007 | Egan, III | B04B 7/18 210/512.1 |
| 2008/0061011 | A1* | 3/2008 | Schmid | B01D 33/044 210/769 |
| 2008/0087391 | A1* | 4/2008 | Grace | B30B 9/20 162/13 |
| 2008/0087392 | A1* | 4/2008 | Grace | D21C 9/06 162/53 |
| 2008/0156747 | A1* | 7/2008 | Grace | B01D 33/073 210/404 |
| 2008/0257506 | A1* | 10/2008 | Grace | B01D 33/067 210/232 |
| 2008/0264113 | A1* | 10/2008 | Andersson | D21C 9/06 68/93 |
| 2010/0213142 | A1* | 8/2010 | Andersson | B01D 33/466 210/393 |
| 2010/0314062 | A1* | 12/2010 | Grace | B30B 9/20 162/217 |
| 2014/0262978 | A1* | 9/2014 | Wojciechowski | B07B 1/4663 209/397 |
| 2015/0292639 | A1* | 10/2015 | Grace | B01D 33/48 210/402 |
| 2017/0087493 | A1* | 3/2017 | Grace | B01D 33/74 |
| 2018/0178147 | A1* | 6/2018 | Thysell | B01D 33/23 |
| 2018/0185879 | A1* | 7/2018 | Torres Jara | B07B 1/4618 |
| 2018/0207558 | A1* | 7/2018 | Bitsch-Larsen | B01D 33/801 |
| 2018/0207559 | A1* | 7/2018 | Bartos | B01D 33/09 |
| 2018/0243797 | A1* | 8/2018 | Wojciechowski | B07B 1/469 |
| 2019/0224597 | A1* | 7/2019 | Harden | B01D 33/42 |
| 2019/0388809 | A1* | 12/2019 | Rawls | B01D 33/067 |
| 2020/0246733 | A1* | 8/2020 | Grace | B01D 33/067 |
| 2021/0129059 | A1* | 5/2021 | Harden | B01D 36/04 |
| 2021/0246096 | A1* | 8/2021 | Keyes | B01D 33/09 |
| 2021/0252436 | A1* | 8/2021 | Sundström | B01D 33/466 |
| 2021/0268410 | A1* | 9/2021 | Townson | B01D 33/44 |
| 2022/0305413 | A1* | 9/2022 | Persson | B01D 25/215 |
| 2023/0201749 | A1* | 6/2023 | Faivre | B01D 33/067 210/404 |
| 2023/0302384 | A1* | 9/2023 | Rawls | B01D 33/09 |

OTHER PUBLICATIONS

U.S. Appl. No. 16/438,732, Advisory Action mailed on Mar. 29, 2023, 8 pages.

U.S. Appl. No. 16/438,732, Final Office Action mailed on Mar. 7, 2023, 13 pages.

U.S. Appl. No. 16/438,732, Non-Final Office Action mailed on Jan. 27, 2022, 12 pages.

Chile Application No. 01696-2019, Office Action mailed on Apr. 26, 2021, 12 pages.

European Application No. 19181255.1, Extended European Search Report mailed on Nov. 18, 2019, 9 pages.

European Application No. 19181255.1, Office Action mailed on May 12, 2021, 4 pages.

* cited by examiner

DRUM WASHER WITH GRAVITY ASSIST DRAINAGE

CROSS-RELATED APPLICATION

This application is a continuation-in-part of U.S. patent application Ser. No. 16/438,732 filed on Jun. 12, 2019, which claims the benefit under 35 U.S.C. § 119 (e) of the earlier filing date of U.S. Provisional Patent Application No. 62/687,381 filed on Jun. 20, 2018, the entirety of which are incorporated herein by reference.

BACKGROUND OF THE INVENTION

Technical Field

The present disclosure relates generally to rotary drum washers used to dewater sludge or other suspensions in any industry and more particularly to recausticizing drums used in the chemical recovery processes in the pulp and paper industry, specifically for the recovery of lime mud or dregs.

Related Art

It is possible to produce pulp on an industrial scale in several ways. Producers tend to classify these methods into one of three general categories: chemical pulping, mechanical pulping, and hybrid pulping. Hybrid pulping involves different aspects of both chemical and mechanical pulping. Briefly, mechanical pulping often involves feeding lignocellulosic material (e.g. wood chips, bagasse, corn stover, recycled paper, or other material comprising the protein lignin and cellulosic polymers) through a series of mechanical refiners. Successive refining grinds the lignocellulosic material to the desired pulp grade. Mill operators may further process this pulp into a number of pulp-based products (e.g. paper, packaging material, absorbent filler, etc.); or the mill operators may sell the pulp wholesale.

In chemical processes, mill operators treat lignocellulosic material with either strong acids or strong bases to disassociate the lignin from the cellulosic fibers. Operators may then separate, wash, and further process the cellulosic fibers into pulp or other pulp-based products. Chemical process examples include: the Kraft process (also known as the "sulfate process"), sulfite process, soda pulping process, and the sulfite semi-chemical pulping process.

While the processing chemicals for each type of chemical process may vary, mill operators frequently recover and recycle these process chemicals to operate the mill economically. In the Kraft process for example, mill operators cook the lignocellulosic material with "white liquor" in large pressurized digesters. The white liquor comprises sodium hydroxide, NaOH, and sodium sulfide, $Na_2S$. After cooking, a slurry of spent chemical liquor and rough pulp, exits the digester. The spent chemical liquor is commonly known as "black liquor" and comprises organic and inorganic compounds left over from the cooking process.

While downstream pulping equipment continues to process the rough pulp, the chemical recovery process begins with isolating, concentrating, and then transferring the black liquor into a chemical recovery boiler. The chemical recovery boiler evaporates excess moisture and the inorganic compounds in the black liquor undergo pyrolysis. These inorganic compounds accumulate as molten salts ("smelt") at the bottom of the recovery boiler and eventually flow into an adjacent dissolving tank. The dissolving tank typically contains "weak wash" comprising the liquors used to wash lime mud and other precipitates. Upon contacting the weak wash, the smelt reacts and mixes with the weak wash to become "green liquor." The green liquor contains the first component of white liquor: sodium sulfide, Na2S, and the byproduct sodium carbonate, $Na_2CO_3$.

Operators then clarify and feed the green liquor into an agitator and add calcium oxide, CaO, and water. Calcium oxide is commonly known as "quicklime." The quicklime exothermically reacts with the water to produce calcium hydroxide, $Ca(OH)_2$. The calcium hydroxide then reacts with the sodium carbonate in the green liquor to produce the other component of white liquor: sodium hydroxide, NaOH, and the byproduct calcium carbonate, $CaCO_3$. Calcium carbonate is commonly known as "lime mud."

At this stage, the lime mud precipitates out of the white liquor solution. Operators then clarify and transfer the white liquor to a storage tank to await reuse in the Kraft process. Meanwhile, operators wash, filter, and transfer the lime mud to a lime kiln for conversion back into quicklime (calcium oxide, CaO). With the recycled quicklime, the mill operators may continue to treat green liquor and recover white liquor cost effectively.

To wash and filter the lime mud prior to feeding the lime mud into the lime kiln, operators may process the lime mud on a rotary drum filter. These filters typically consist of a cylindrical drum that is partially submerged in a vat of lime mud. A fabric, plastic, or metal mesh covers the outer surface of the drum and serves as a filter medium. The drum rotates around a center drainage channel that connects to a vacuum system at one end of the drum. Air flowing through the drop leg creates a vacuum. Conduits connect drainage holes in the drum to the center drainage channel. The vacuum allows lime mud to accumulate on a submerged sector of the drum. As the drum sector rotates out of the vat, filtrate flows through the filter medium, drainage holes, conduits, center drainage channel, and vacuum system. Before the sector rotates back down into the vat, a doctor blade shears off the dewatered lime mud. Operators then collect this dewatered lime mud and may store it before feeding it into a lime kiln.

The rate at which filtrate exits the sector can be limited by the rate of rotation and the number of drainage holes in each sector. With current rotary drum filter designs, there is a point at which increasing the rate of rotation will not further increase filtration. To compensate, one might think to add more drainage holes, but adding more drainage holes presents its own problems. Adding too many drainage holes reduces the pressure differential between the drum and lime mud, thereby decreasing the drum's ability to develop an initial mud layer. This initial mud layer acts as a primary filter medium and allows additional mud to accumulate on top of the initial layer. Furthermore, existing rotary filter drums may have structural components at locations desirable for an additional drainage hole. Increasing the number of drainage holes may also weaken the structural integrity of the rotary filter drum. Accordingly, there is a long felt and unresolved need to increase the rate of filtration without weakening the structural integrity of the rotary filter drum.

SUMMARY OF THE INVENTION

The problem of unrealized production in rotary filter drums due to undirected filtrate flow through the sectors is mitigated by a rotary drum filter including: a drum shell configured to rotate through a slurry, the drum shell having areas defining a plurality of drainage holes, at least one divider plate disposed on an outer surface of the drum shell and extending longitudinally and laterally along the drum shell, wherein the divider plate has a first end and a second end, and wherein the first end is disposed near a drainage hole and is thereby configured to direct a filtrate into the drainage hole, a filter medium disposed on one or more grids, wherein the one or more grids are disposed on the outer surface of the drum shell above the at least one divider plate, wherein the at least one divider plate is configured to direct filtrate on the outer surface of the drum shell filtered through the filter medium into the drainage hole.

An exemplary rotary drum filter may further include grid holders having multiple slots disposed along the length of the grid holders, wherein the grid holders extend longitudinally on an outer surface of a drum shell at arcuate intervals to define multiple arcuate drainage sectors. divider plates may be disposed between the drainage sectors.

In still other exemplary embodiments, a divider plate may extend from one or more grids disposed around the drum shell.

In another exemplary embodiment, the problem of unrealized production in rotary filter drums due to undirected filtrate flow through the sectors is mitigated by a rotary drum filter including: a drum shell having areas defining a plurality of drainage holes, wherein the drum shell is configured to rotate through a slurry, a plurality of grid holders having multiple slots disposed along the length of the grid holders, wherein the grid holders extend longitudinally on an outer surface of a drum shell at arcuate intervals, a first drainage sector disposed between a first grid holder and a middle grid holder and a second drainage sector disposed adjacent to the first arcuate drainage sector between the middle grid holder and a second grid holder, wherein each of the arcuate drainage sectors have a first longitudinal edge distally disposed from a second longitudinal edge, wherein the first arcuate drainage sector and the second arcuate drainage sector have drainage holes disposed at a first lateral edge and at a second lateral edge distally disposed from the first lateral edge, and divider plates disposed on the outer surface of the drum shell, the divider plates extending longitudinally and laterally within the first drainage sector and the second drainage sector, wherein a first end of a first divider plates in the first drainage sector and a first end of a first divider plate in the second drainage sector converge toward the middle grid holder; and a filter medium disposed on the plurality of grids, wherein the divider plates are configured to direct filtrate flow on the outer surface of the drum shell into one or more of the plurality of drainage holes.

An advantage of exemplary embodiments of the present disclosure is that suppliers may retrofit existing rotary filter drums with exemplary slotted grid holders and divider plates.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

DETAILED DESCRIPTION OF THE INVENTION

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters (e.g. 140, 240, 340, 440) indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

Figure 1A:
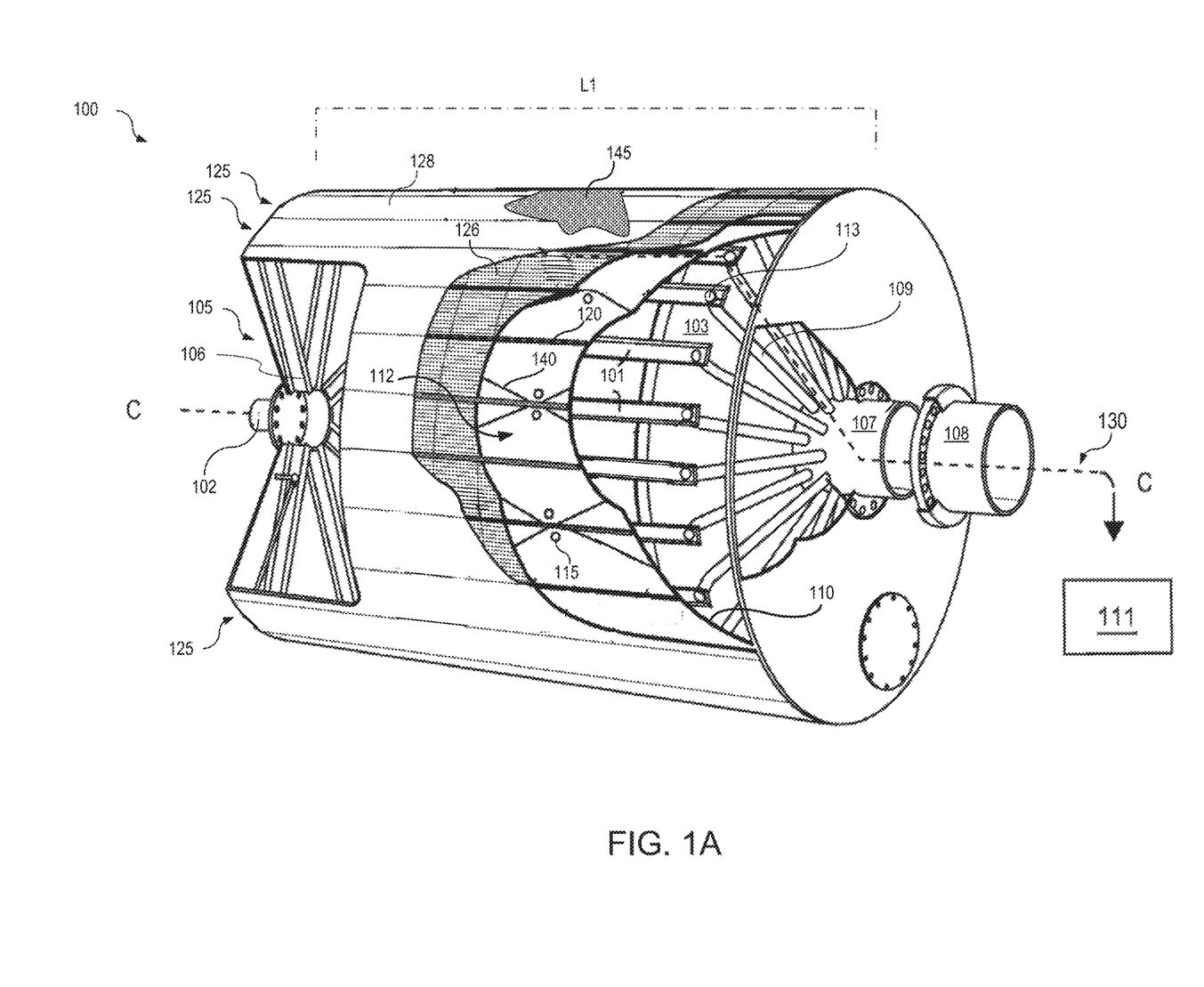
FIG. 1A is a perspective view of a schematic representation of an exemplary rotary drum filter having diagonal divider plates.

Rotary drum filters are used in several industries and for several applications. For example, in the pulp and paper industry, rotary drum filers can be used to filter lime mud, in brown stock washing, and in pulp bleaching. Rotary drum filters are also used in other industries that require large-scale separation of solids from liquids, for example in the mining industry. FIG. 1A is a schematic perspective representation of an exemplary rotary drum filter 100 comprising a drum shell 110 having areas defining a plurality of drainage holes 115. The rotary drum filter 100 includes a rotary support structure 105 that may include beams 106 and or support discs 103 extending radially around a center of rotation C. A journal 102 or a central drainage channel 107 may surround the center of rotation C.

The support structure 105 may further include drainage conduits 109 that fluidly communicate with the drainage holes 115 and the central drainage channel 107. It will be understood that in other exemplary rotary drum filters, the drainage conduits 109 may not be structural. In certain exemplary embodiments, a trough 101 may be disposed interior to the drum shell 110 under a row of drainage holes 115 and in fluid communication with one or more drainage conduits 109. In these embodiments, the trough 101 permits filtrate 130 to flow from the row of drainage holes 115 to the drainage conduit 109 via a drainage conduit hole 113 at an outer end of the drainage conduit 109. An end 108 of the central drainage channel 107 fluidly communicates with a vacuum system 111, which typically includes a vacuum tank and a pump. The vacuum system 111 creates a vacuum that facilitates the extraction of filtrate 130 from the suspension 145. The suspension may be lime mud, dregs, pulp, sludge, a mineral slurry, or other suspension of solids and liquids that can be separated with a rotary drum filter 100.

In the depicted embodiment, grid holders 120 extend longitudinally on an outer surface 112 of the drum shell 110 and are disposed at arcuate intervals to define multiple arcuate drainage sectors 125. The grid holders 120 may be welded or otherwise affixed to the outer surface 112 of the drum shell 110 along a length L1 of the drum shell 110.

Figure 4A:
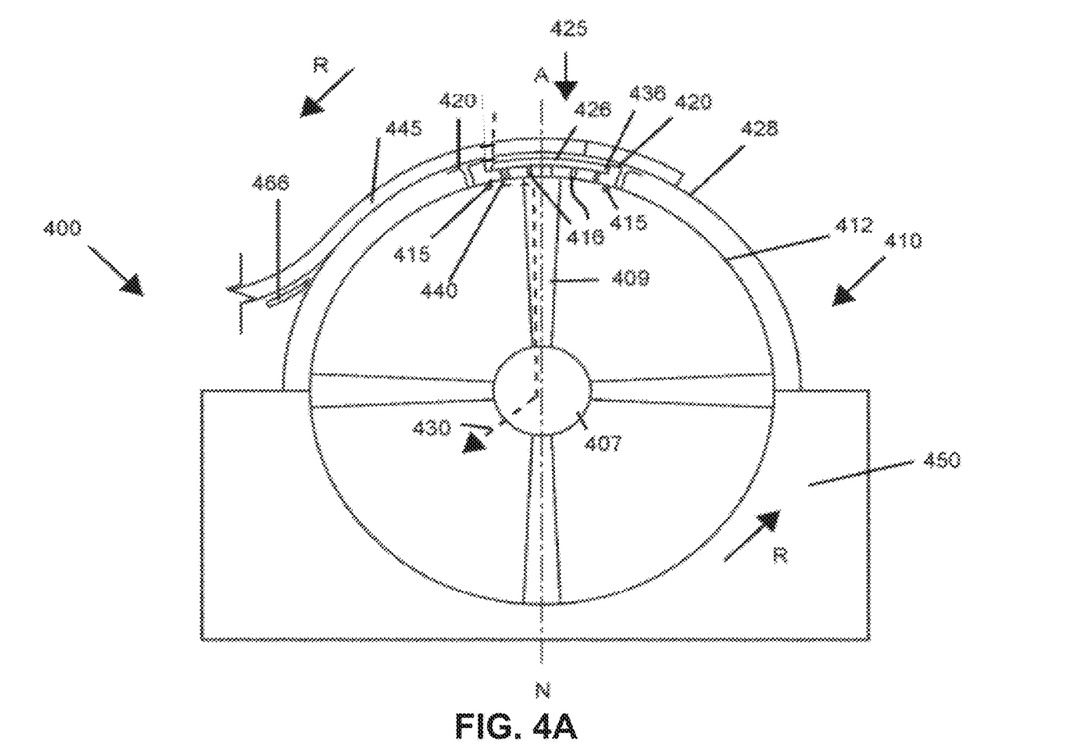
FIG. 4A is a representation of a width side of an exemplary rotary drum filter.
Figure 4B:
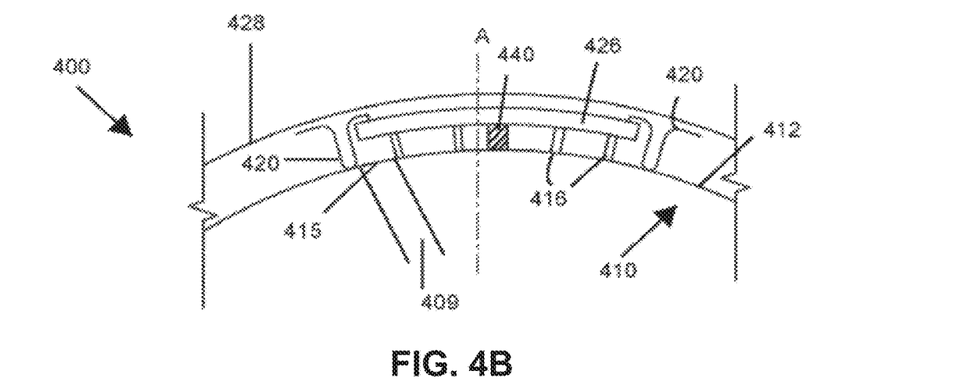
FIG. 4B is a detailed side view of the apex of FIG. 4A.

Segments of the grid 126 are disposed between two adjacent grid holders 120 and above one or more divider plates 140. A filter medium 128, which may be a fabric, plastic, or wire mesh screen, is disposed over the grid 126 around the drum shell 110. FIGS. 4A and 4B provide additional details of the relative positions of the grid, grid holders, divider plates, and filter medium in relation to the drum shell.

One or more divider plates 140 may be disposed on the outer surface 112 of the drum shell 110 and may extend longitudinally and laterally within each arcuate drainage sector 125. The grid holders 120 may extend above a top surface of the divider plates 140. The one or more divider plates 140 may be welded or otherwise affixed to the outer surface 112 of the drum shell 110. Each divider plate 140 may be a strip cut from a flat sheet of plate material. Each strip may be formed to conform to the curvature of the outer surface 112 of the drum shell 110 such that when attached to the outer surface 112 of the drum shell 110 each strip (i.e., divider plate 140) divides a drainage sector 125 into separate sections.

Figure 1B:
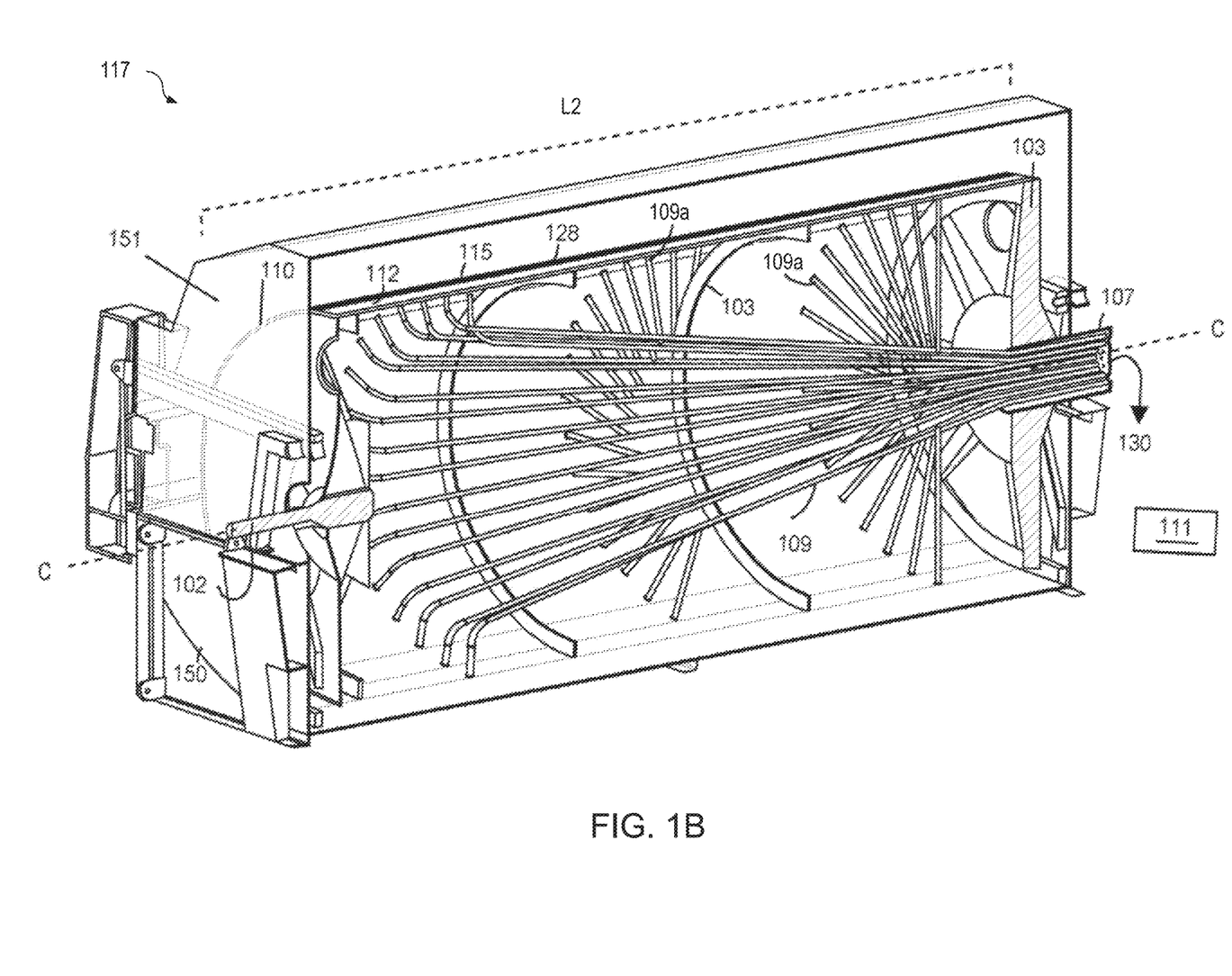
FIG. 1B is perspective cross-sectional view of an alternative construction of an exemplary rotary drum filter having diagonal divider plates.

FIG. 1B is a cross-sectional perspective view of an alternative rotary drum filter design 117. This view shows the drum shell 110 disposed within a vat 150 and housing 151. The drainage conduits 109 extend generally further along the length L2 of the drum shell 110 than the embodiment of FIG. 1A. The drainage conduits 109 and brachial conduits 109a extending from the drainage conduits 109 may fluidly communicate directly with the drainage holes 115 and thereby avoid the use of troughs 101 as shown in FIG. 1A. Although not depicted in FIG. 1B, the alternative rotary drum filter 105 has divider plates extending laterally and longitudinally along the outer surface 112 of the drum shell 110 in a manner similar to the manner depicted in FIG. 1A. A first end of each divider plate may be disposed near a first drainage hole 115 and a second end of each divider plate may be disposed near a second drainage hole 115 located longitudinally and laterally distal from the first drainage hole 115.

Figure 2A:
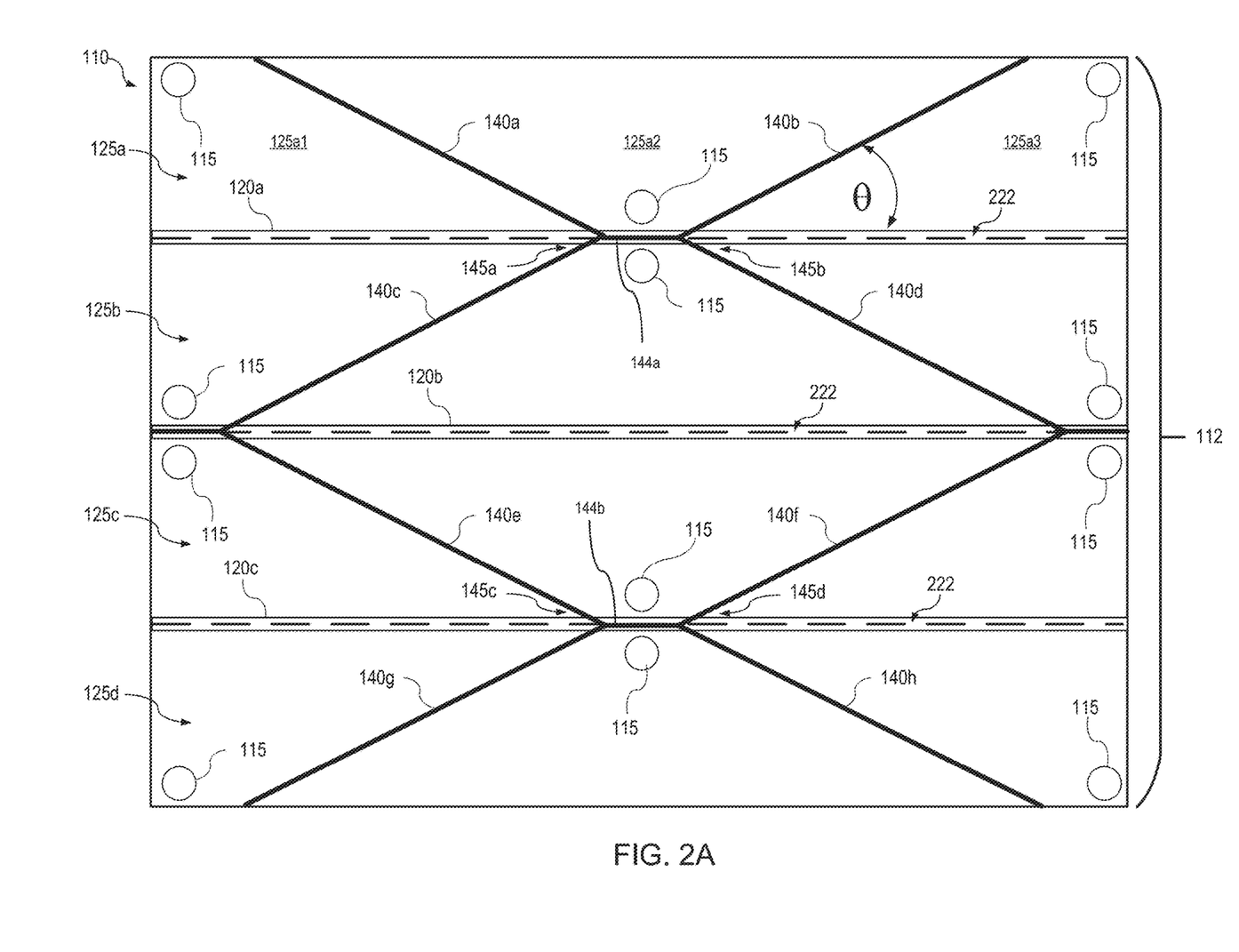
FIG. 2A illustrates a side view of a schematic representation of a surface of an exemplary drum shell having at least two divider plates attached to the surface of the drum shell in each drainage sector. This side view shows the length of the exemplary rotary drum filter.

FIG. 2A illustrates a side view of a schematic representation of an outer surface 112 of an exemplary drum shell 110 having at least two divider plates 140a-140h attached to the outer surface 112 of the drum shell 110 in each drainage sector 125a-125d. As illustrated in FIG. 2A, the drum shell 110 may have at least two divider plates 140a, 140b attached to the outer surface 112 of the drum shell 110 in the first drainage sector 125a, at least two divider plates 140c, 140d attached to the outer surface 112 of the drum shell 110 in the second drainage sector 125b, at least two divider plates 140e, 140f attached to the outer surface 112 of the drum shell 110 in the third drainage sector 125c, and at least two divider plates 140g, 140h attached to the outer surface 112 of the drum shell 110 in the fourth drainage sector 125d. In some implementations, a divider plate may extend along two or more adjacent drainage sectors.

Each drainage sector is separated from an adjacent drainage sector by grid holders 120a-120c. Each grid holder 120a-120c may include a number of drainage slots 222 disposed along a length of the grid holder 120a-120c to enable filtrate 130 to flow on the outer surface 112 of the drum shell 110 through the drainage slots 222. In other exemplary embodiments, the grid holders may be disposed slightly above the outer surface 112 of the drum shell 110 to permit filtrate 130 to flow underneath the grid holder. In such embodiments where the grid holder is disposed above the drum shell 110, the grid holders may lack the slots 222.

The divider plates 140a-140h may be welded or otherwise affixed to the outer surface 112 of the drum shell 110. The divider plates 140a-140h may be disposed at an angle θ relative to the adjacent grid holders 120a-120c. Each divider plate 140 may be a strip cut from a flat sheet of plate material, for example, stainless steel or another material suitable for the process conditions. Each strip may be formed to conform to the curvature of the outer surface 112 of the drum shell 110 at the angle θ such that when attached to the outer surface 112 of the drum shell 110 each strip (i.e., divider plates 140a-140h) divides a drainage sector 125a-125d into separate sections where each section includes one or more drain holes 115. For example, divider plate 140a divides the first drainage sector 125a into a first section 125a1 bounded by the divider plate 140a, the first longitudinal edge 225a, and the first and second lateral edges 228a and 228b. Divider plates 140a and 140b divide the first drainage sector 125a into a second section 125a2 bounded by the divider plates 140a and 140b and the first and second lateral edges 228a and 228b. Divider plate 140b divides the first drainage sector 125a into a third section 125a3 bounded by the divider plate 140b, the second longitudinal edge 227a, and the first and second lateral edges 228a and 228b. The other drainage sections are similarly divided by the divider plates.

A connecting portion 144a may connect an apex 145a formed where the first divider plates 140a, 140c connect to an apex 145b formed where the second divider plates 140b, 140d connect. Similarly, connecting portions may connect apexes of other divider plates. For example, connecting portion 144b may connect the apex 145c of divider plates 140e, 140g to the apex 145d of divider plates 140f, 140h. In some implementations, the connecting portions may be implemented as part of the divider plates. In some implementations, the connecting portions may be implemented as part of the grid holders.

Figure 2B:
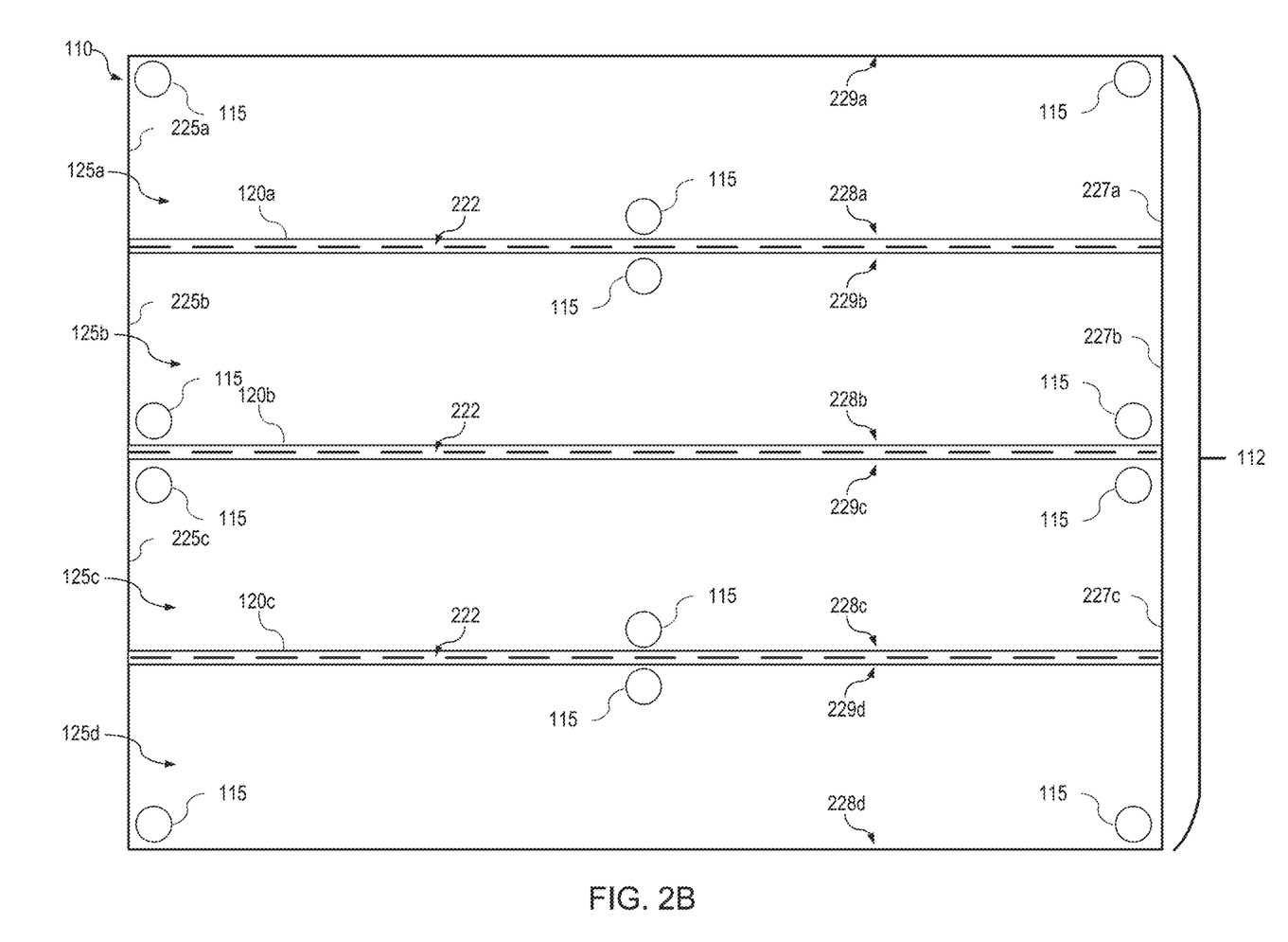
FIG. 2B illustrates a side view of a schematic representation of a surface of an exemplary drum shell showing the grid holders with the divider plates removed.

FIG. 2B illustrates a side view of a schematic representation of an outer surface 112 of an exemplary drum shell 110 showing the grid holders 120a-120c with the divider plates removed. The grid holders 120a-120c form a separation between adjacent drainage sectors 125a-125d. Each of the drainage sectors 125a-125d have a first longitudinal edge 225a-225d distally disposed from a second longitudinal edge 227a-227d and a first lateral edge 228a-228d distally disposed from a second lateral edge 229a-229d. The lateral edges of the drainage sectors may be coextensive with the grid holders. While only a few drainage sectors are illustrated and described, it should be appreciated that drainage sectors are disposed around the entire circumference of the drum shell 110.

Figure 2C:
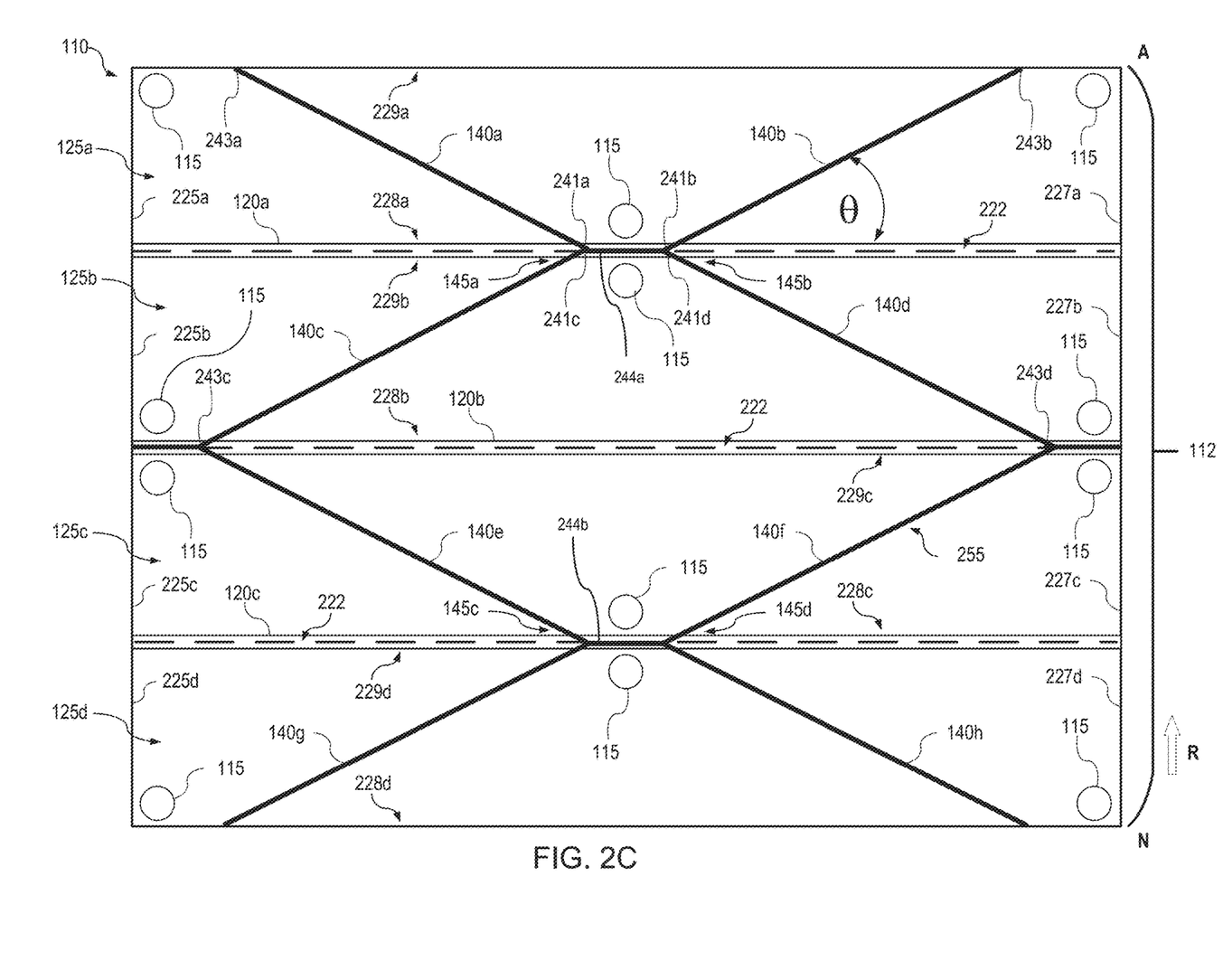
FIG. 2C illustrates a side view of a schematic representation of a surface of an exemplary drum shell showing the grid holders with the divider plates installed.

FIG. 2C illustrates a side view of a schematic representation of an outer surface 112 of an exemplary drum shell 110 showing the grid holders 120a-120c with the divider plates 140a-140h installed. The configuration of the divider plates and the grid holders is explained with reference to the first drainage sector 125a and the second drainage sector 125b. Referring to FIGS. 2B and 2C, the first drainage sector 125a is disposed adjacent to a second drainage sector 125b along the first lateral edge 228a of the first drainage sector 225a and the second lateral edge 229b of the second drainage sector 125b. In the first drainage sector 125a, a first end 241a of a first divider plate 140a is disposed adjacent to the first lateral edge 228a and further from the first longitudinal edge 225a of the first drainage sector 125a than a second end 243a of the first divider plate 140a. The second end 243a of the first divider plate 140a is disposed adjacent to the second lateral edge 229a and the first longitudinal edge 225a of the first drainage sector 125a.

In the second drainage sector 125b, a first end 241c of a first divider plate 140c is disposed adjacent to the second lateral edge 229b and further from the first longitudinal edge 225b of the second drainage sector 125b than a second end 243c of the first divider plate 140c. The second end 243c of the first divider plate 140c is disposed adjacent to the first lateral edge 228b and the first longitudinal edge 225b of the second drainage sector 125b. Thus, the first divider plates 140a and 140c converge toward a middle grid holder 120a disposed between the first drainage sector 125a and the second drainage sector 125b and may be described as "converging divider plates."

As further illustrated in FIGS. 2B and 2C, a first end 241b of a second divider plate 140b in the first drainage sector 125a is disposed adjacent to the first lateral edge 228a and further from the second longitudinal edge 227a of the first drainage sector 125a than a second end 243b of the second divider plate 140b. The second end 243b of the second divider plate 140b is disposed adjacent to the second lateral edge 229a and the second longitudinal edge 227a of the first drainage sector 125a.

A first end 241d of a second divider plate 140d in the second drainage sector 225b is disposed adjacent to the second lateral edge 229b and further from the second longitudinal edge 227b of the second drainage sector 225b than a second end 243d of the second divider plate 140d. The second end 243d of the second divider plate 140d in the second drainage sector 225b is disposed adjacent to the first lateral edge 228b and the second longitudinal edge 227b of the second drainage sector 225b. Thus, the second divider plates 140b and 140d diverge from a middle grid holder 120a disposed between the first drainage sector 125a and the second drainage sector 125b and may be described as "diverging divider plates."

It will be understood that a particular drainage sector may have both converging and diverging divider plates and that convergence and divergence will change depending upon which grid holder serves as the middle grid holder for a particular set of adjacent drainage sectors. In the depicted embodiment, the drum shell 110 defines a drainage hole 115 near each end of the divider plates.

A connecting portion 144a may connect an apex 145a of the converging divider plates (e.g., the first divider plates 140a, 140c) to an apex 145b of the diverging divider plates (e.g., the second divider plates 140b, 140d). Similarly, connecting portions may connect apexes of other converging and diverging divider plates. For example, connecting portion 144b connecting the apex 145c of divider plates 140e, 140g to the apex 145d of divider plates 140f, 140h. In some implementations, the connecting portions may be implemented as part of the divider plates. In some implementations, the connecting portions may be implemented as part of the grid holders.

As illustrated in FIG. 2C, the converging and diverging divider plates 140c-140f and the connecting portions 144a, 144b may create a hexagonal shape 255 between adjacent drainage sectors 225b and 225c. For example, in FIG. 2C, the hexagonal shape 255 is formed by the divider plate 140f, the divider plate 140d, the connecting portion 244a, the divider plate 140c, the divider plate 140e, and the connecting portion 244b. It will be understood that in other exemplary embodiments, the converging and diverging divider plates among adjacent drainage sectors may create shapes that are generally ovoid, circular, rhombic, oblong, octagonal, or other polygonal shape configured to direct the filtrate 130 to a drainage hole 115 oriented closer to the nadir N of rotation R. As such, although the straight diagonally oriented divider plates illustrate one embodiment, it will be understood that this disclosure also covers divider plates that are generally concave, convex, curved, segmented, and made up of smaller straight elements, but generally curved overall.

It will be further understood that the configuration of drainage holes shown in FIGS. 2A-2C is an example of how drainage holes may be arranged on an example drum shell 110. In other exemplary embodiments, a drainage hole or the drainage holes may be disposed between adjacent drainage sections (e.g., under a grid holder 220). In embodiments lacking grid holders, a drainage hole may be disposed between adjacent drainage sections.

Figure 3:
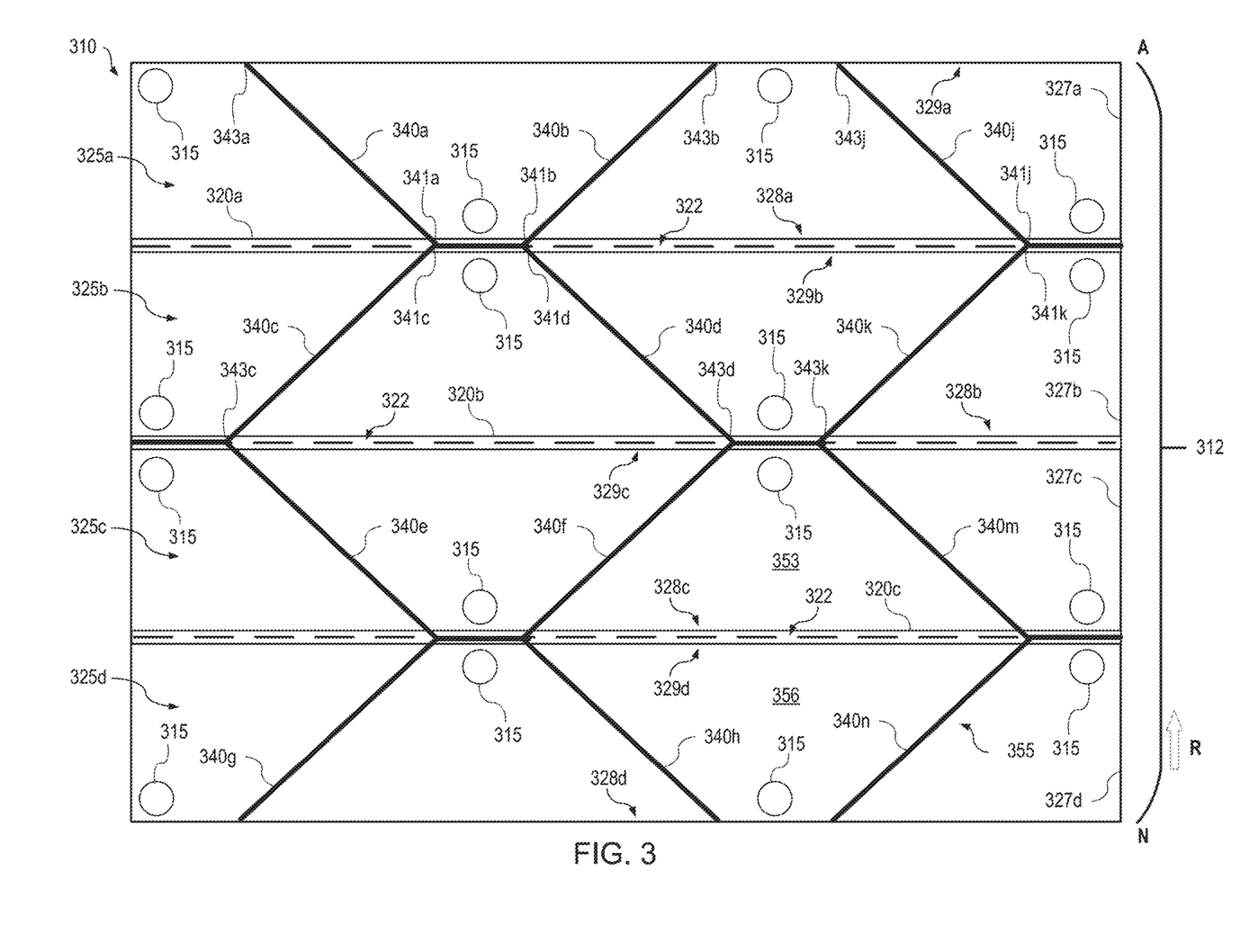
FIG. 3 is a side view representation of an exemplary rotary drum filter having at least three divider plates in each drainage sector. This side view shows the length of the exemplary rotary drum filter.

FIG. 3 illustrates another exemplary drum shell 310 in which each drainage sector 325a-325d includes at least three divider plates. For example, drainage sector 325a includes divider plates 340a, 340b, and 340j. Similarly, drainage sector 325b includes divider plates 340c, 340d, and 340k, drainage sector 325c includes divider plates 340e, 340f, and 340m, and drainage sector 325d includes divider plates 340g, 340h, and 340n. The divider plates 340a-340h, 340j, 340k, 340m, 340n may be similar to the divider plates 140a-140h in FIGS. 2A and 2C. The divider plates 340j, 340k, 340m, 340n may be disposed closer to the second lateral edges 327a-327d of the drainage sectors 325a-325d than the divider plates 340b, 340d, 340f, 340e.

Each drainage sector 325a-325d is separated from an adjacent drainage sector by grid holders 320a-320c. The grid holders 320a-320c and slots 322 may be similar to the grid holders 120a-120c and slots 222 in FIGS. 2A-2C. Drainage holes 315 may be provided in the drainage sectors 325a-325d similar to the drainage holes 115 provided in the drainage sectors 125a-125d in FIG. 2A-2C. It will be understood that in other exemplary embodiments, the number of divider plates in a drainage sector may be more than three.

The configuration of the divider plates and the grid holders is explained with reference to the first drainage sector 325a and the second drainage sector 325b. The first drainage sector 325a is disposed adjacent to a second drainage sector 325b along the first lateral edge 328a of the first drainage sector 325a and the second lateral edge 329b of the second drainage sector 325b. In the embodiment illustrated in FIG. 3, the drainage sector 325a-325d each include a third divider plate 340j, 340k, 340m, and 340n, respectively.

In the first drainage sector 325a, a first end 341a of a first divider plate 340a is disposed adjacent to the first lateral edge 328a and further from the first longitudinal edge 325a of the first drainage sector 325a than a second end 343a of the first divider plate 340a. The second end 343a of the first divider plate 340a is disposed adjacent to the second lateral edge 329a and the first longitudinal edge 325a of the first drainage sector 325a.

In the second drainage sector 325b, a first end 341c of a first divider plate 340c is disposed adjacent to the second lateral edge 329b and further from the first longitudinal edge 325b of the second drainage sector 325b than a second end 343c of the first divider plate 340c. The second end 343c of the first divider plate 340c is disposed adjacent to the first lateral edge 328b and the first longitudinal edge 325b of the second drainage sector 325b.

As further illustrated in FIG. 3, a first end 341b of a second divider plate 340b in the first drainage sector 325a is disposed adjacent to the first lateral edge 328a and further from the second longitudinal edge 327a of the first drainage sector 325a than a second end 343b of the second divider plate 340b. The second end 343b of the second divider plate 340b is disposed adjacent to the second lateral edge 329a and closer to the second longitudinal edge 327a of the first drainage sector 325a than the first end 341b of a second divider plate 340b.

A first end 341d of a second divider plate 340d in the second drainage sector 325b is disposed adjacent to the second lateral edge 329b and further from the second longitudinal edge 327b of the second drainage sector 325b than a second end 343d of the second divider plate 340d. The second end 343d of the second divider plate 340d in the second drainage sector 325b is disposed adjacent to the first lateral edge 328b and the second longitudinal edge 327b of the second drainage sector 225b. and closer to the second longitudinal edge 327b of the second drainage sector 325b than the first end 341d of a second divider plate 340d.

As further illustrated in FIG. 3, in the first drainage sector 325a, a first end 341j of the third divider plate 340j is disposed adjacent to a first lateral edge 328a and closer to a second longitudinal edge 327a of the first drainage sector 325a than a second end 343j of the third divider plate 340j. The second end 343j of the third divider plate 340j is disposed adjacent to the second lateral edge 329a of the first drainage sector 325a and further from the second longitudinal edge 327a of the first drainage sector 325a than the first end 341j of the third divider plate 340j.

In the second drainage sector 325b, a first end 341k of the third divider plate 340k is disposed adjacent to the second lateral edge 329b of the second drainage sector 325b and closer to the second longitudinal edge 327b of the second drainage sector 325b than a second end 343k of the third divider plate 340k. The second end 343k of the third divider plate 340k is disposed adjacent to the first lateral edge 328b of the second drainage sector 325b and further from the second longitudinal edge 327b of the second drainage sector 325b than the first end 341k of the third divider plate 340k.

As in FIG. 2C, the converging and diverging divider plates and connecting portions define a series of hexagonal shapes among the drainage sectors. As shown in FIG. 3, a grid holder (e.g., the grid holder 320c) bisects at least one hexagonal shape 355 to define a first section 356 of the hexagonal shape 355 and a second section 353 of the hexagonal shape 355. The first section 356 of the hexagonal shape 355 is disposed closer to the nadir N of rotation while a given drainage sector (e.g., drainage sector 325d) ascends towards the apex A of rotation. After a point on the given drainage sector 325d passes the apex A of rotation, the second section 353 of the hexagonal shape 355 will be oriented closer to the nadir N of rotation than the first section 356. Upon passing the nadir N of rotation, the first section 356 of the hexagonal shape 355 will again be disposed closer to the nadir N of rotation than the second section 353 of the hexagonal shape 355, thereby starting a new cycle.

It will be understood that whichever of the first or second sections 356, 353 of the hexagonal shape 355 is disposed closer to the nadir N of rotation at any given point of rotation will be referred to as the lower section relative to the other section. Likewise, whichever of the first or second sections 356, 353 is disposed closer to the apex A of rotation at any given point of rotation will be referred to as the upper section relative to the other section. It will be further understood that in other exemplary embodiments a given grid holder may not bisect the shape formed by the divider plates and that the first section and second section may not be equal in area.

As can be visualized with reference to FIGS. 3 and 4A, the first section 356 of the hexagonal shape 355 directs filtrate to the first lateral edge 328d of the drainage sector 325d on the ascent. The slots 322 along the grid holder 320c permit the filtrate to flow downwardly along the outer surface 312 of the drum shell 310 from the drainage sector 325c into the adjacent drainage sector 325d wherein the first section 356 collects the downwardly flowing filtrate at a drainage hole 315 near the first lateral edge 328d of the drainage sector 325d. The adjacent sets of diverging divider plates 340f, 340h and converging divider plates 340m, 340n direct the filtrate to a drainage hole 315 disposed near the first lateral edge 328d of the drainage sector 325d.

After the drainage sector 325d rotates past the apex A, the filtrate begins to flow downwardly toward the second lateral edge 329d of the drainage sector 325d. The second section 353 of the hexagonal shape 355 on the ascent now become closer to the nadir N on the descent. The second section 353 thereby directs the filtrate to drainage hole 315 disposed near the second lateral edge 329c of the drainage sector 325c. Filtrate may reverse course and flow back through the slots 322 in the grid holder 320c before encountering the second section 353 of the hexagonal shape 355 in a downwardly adjacent drainage sector 325c.

Without being bound by theory, Applicant believes that the combination of divider plates configured to direct filtrate to drainage holes disposed near a lateral edge of a drainage sector and adjacent drainage sectors that are configured to fluidly communicate with each other (e.g., through slots 322 or by an absence of an obstructions between the lateral sides of adjacent drainage sectors) effectively increases the available drainage area for the filtrate while maintaining the structural integrity of the outer drum assembly (see FIG. 4). This, and the arrangement of the divider plates can allow operators to effectively increase the drainage capacity of rotary drum filters that are approaching or that are at their maximum effective rotational velocity (i.e., the velocity at which increased rotation will not result in increased filtration).

It is contemplated that the divider plates may be fabricated from steel, such as 304 stainless steel, 316 stainless steel, carbon steel, titanium, or other materials having the structural rigidity and durability to support the outer drum assembly (see FIG. 4) while withstanding the caustic nature of the filtrate. For example, in lime mud rotary drum filters, the filtrate may comprise residual sodium hydroxide (NaOH), a highly caustic compound. By way of another example, it is contemplated that manufacturers will typically select titanium divider plates for rotary drum filters used in the pulp bleaching process.

FIG. 4A is a side view along a width of a rotary drum filter 400. Only one drainage sector 425 is depicted for ease of reference. In this embodiment, the drum shell 410 rotates in direction R around an axis of rotation C. Drainage conduits 409 extend radially outward from the center drainage channel 407 and fluidly communicate with drainage holes 415 (e.g., through a trough 101 (see FIG. 1A). FIG. 4A better illustrates a grid 426 disposed on the outer surface 412 of the drum shell 410 between adjacent grid holders 420. Grid legs 416 support the grid 426 on the outer surface 412 of the drum shell 410. The filter medium 428 surrounds the grid holders 420 and grids 426. Divider plates 440 are disposed on the outer surface 412 of the drum shell 410. Collectively, these components may be known as the outer drum assembly. The drainage sector 425 and associated components may be similar to the drainage sectors and corresponding components described with respect to FIGS. 1A, 1, and 2A-2C.

In operation, the drum shell 410 may rotate in direction R through a suspension vat 450. As a drainage sector 425 exits the suspension vat 450, the suspension 445 adheres to the filter medium 428 and rotates toward the apex A of rotation. In FIG. 4A, a portion of the suspension 445 is depicted beginning at about the one o'clock position and extending along the filter medium 428 around the drum shell 410. Only the portion of the suspension 445 is shown to avoid confusion caused by too many intersecting lines, but it will be understood that the suspension begins adhering to the filter medium 428 below the three o'clock position. The references to one o'clock and three o'clock refer to the hours on an analog clock face and are used herein to reference a position on the circle. As the drum shell 410 rotates upwards out of the suspension vat 450, a vacuum system and gravity pull filtrate 430 through the filter medium 428 and into a drainage sector 425. Before the drainage sector 425 rotates back into the suspension vat 450, a doctor blade 466 shears off the dewatered solids that remain after filtration of the suspension 445. When the solids are lime mud, operators may then feed this lime mud to a lime kiln.

FIG. 4B is a detailed side view of a drainage sector 425 at the apex A of rotation of the rotary drum filter 400 shown in FIG. 4A. The line of intersection is disposed further down the length of the drum in FIG. 4B. As such, the divider plate 440, which is disposed longitudinally and laterally on the outer surface 412 of the drum shell 410 appears to be in a different location from the divider plate 440 depicted in FIG. 4A. Both of these figures depict the divider plate 440 disposed under the grid 426 and between the grid legs 416. By placing the divider plates 440 under the grid 426 and by having the divider plates 440 extend across the area that the grid 426 covers, the divider plate 440 further supports the grid 426 and can transfer forces from the slotted grid holders 420. As a result of placing the divider plates under the grid, it is contemplated that servicers can retrofit the drum surface of existing rotary drum filters without redesigning the entire drum shell. Servicers may have to break off some existing grid legs to allow the divider plate to extend laterally and longitudinally on the drum surface.

In other exemplary embodiments, the divider plates may all be oriented in the same direction such that the filtrate may flow (for example) from left to right and downwardly along the outer surface of the rotary drum filter toward a drainage hole. In certain exemplary embodiments, the angle θ may be 90 degrees. By way of example, the angle θ may have a range between about 25 degrees and 90 degrees.

In other exemplary embodiments, the grid holders 120a-120c, 320a-320c, 420 may be omitted. In such embodiments, the grids 126, 426 are configured to engage the divider plates 140a-140h, 340a-340h, 340j, 340k, 340m, 340n, 440. Fasteners secure the grids 126, 426 to the divider plates 140a-140h, 340a-340h, 340j, 340k, 340m, 340n, 440. In other exemplary configurations, the divider plates 140a-140h, 340a-340h, 340j, 340k, 340m, 340n, 440 are an integral part of the grid 126, 426. The grids 126, 426 themselves may be made of any material sufficiently durable to withstand the environment within the vat housing for prolonged periods. However, the grids are typically plastic and are made through an injection molding process. An exemplary grid injection mold will have a negative space capable of being filled with liquid plastic to define a divider plate 140a-140h, 340a-340h, 340j, 340k, 340m, 340n, 440. When an exemplary grid is disposed on the drum shell 110, 310, 410, the divider plate 140a-140h, 340a-340h, 340j, 340k, 340m, 340n, 440 extends from the bottom of the grid 126, 426.

The lack of grid holders may be advantageous because the lack of grid holders would obviate the need for slots and thereby increase the area through which filtrate may flow from the second section of the of the hexagonal shape of an ascending section of the drum shell to the first section of the hexagonal shape. The orientation of the divider plates further directs the filtrate to the drainage hole disposed at the first lateral edge 436 of the drainage sector 425. In this manner, the exemplary embodiments described herein use gravity, open spaces between adjacent drum sectors, and divider plates extending longitudinally and laterally across the outer surface 112 of the drum shell and leading to drainage holes to increase the rate of filtration over conventional rotary drum filters.

An exemplary embodiment rotary drum filter in accordance with this disclosure includes: a drum shell having areas defining a plurality of drainage holes, a divider plate disposed on an outer surface of the drum shell and extending longitudinally and laterally along the drum shell, wherein the divider plate has a first end and a second end, and wherein the first end is disposed near a drainage hole.

Such an exemplary embodiment may further include a rotary support structure disposed around a center axis of rotation and a central drainage channel, wherein an end of the central drainage channel fluidly communicates with a vacuum system, drainage conduits fluidly communicating with the drainage holes and the central drainage channel, a grid disposed between two adjacent grid holders and over the divider plate, and a filter medium disposed around the rotary filter drum. In certain exemplary embodiments, the first ends of two or more of the multiple divider plates are adjacently disposed to separate drainage holes.

The exemplary embodiment may further include grid holders extending longitudinally on an outer surface of the drum shell and disposed at arcuate intervals to define multiple arcuate drainage sectors disposed around the drum shell, wherein a grid holder of the multiple grid holders includes multiple slots disposed along a length of the grid holder. In certain exemplary embodiments, the rotary drum filter may further include grids disposed around the outer surface of the drum, wherein the divider plate engages a bottom of the grid disposed around the outer surface of the drum. In still other exemplary embodiments, the divider plate extends from a bottom of the grid disposed around the outer surface of the drum.

Another exemplary rotary drum filter includes: a drum shell having areas defining a plurality of drainage holes, grid holders, wherein the grid holders extend longitudinally on an outer surface of a drum shell at arcuate intervals to define multiple arcuate drainage sectors including: a first drainage sector, and a second drainage sector disposed adjacent to the first drainage sector, wherein each of the drainage sectors have: a first longitudinal edge distally disposed from a second longitudinal edge, and a first lateral edge distally disposed from a second lateral edge, wherein the first drainage sector and the second drainage sector have drainage holes disposed near the first lateral edge and the second lateral edge, and divider plates disposed on the outer surface of the drum shell and extending longitudinally and laterally within the first drainage sector and the second drainage sector, wherein an end of the divider plates in the first drainage sector and the second drainage sector converges toward a middle grid holder disposed between the first drainage sector and the second drainage sector.

In such an exemplary embodiment, the first drainage sector may further include at least two divider plates and the second drainage sector may further include at least two divider plates, wherein a second divider plate of the at least two divider plates in each drainage sector is longitudinally distally disposed from a first divider plate in each drainage sector, wherein a first end of the first divider plate in the first drainage sector is disposed closer to the first lateral edge and the first longitudinal edge of the first drainage sector and a second end of the first divider plate in the first drainage sector is disposed closer to the second lateral edge and the second longitudinal edge of the first drainage sector, wherein a first end of the first divider plate in the second drainage sector is disposed closer to the second lateral edge and the first longitudinal edge of the second drainage sector and a second end of the first divider plate in the second drainage sector is disposed closer to the first lateral edge and the second longitudinal edge of the second drainage sector, whereby the first divider plates in the first drainage sector and the second drainage sector define converging divider plates, wherein a first end of the second divider plate in the first drainage sector is disposed closer to the second lateral edge and the first longitudinal edge of the first drainage sector and a second end of the second divider plate in the first drainage sector is disposed closer to the first lateral edge and the second longitudinal edge of the first drainage sector, wherein a first end of the second divider plate in the second drainage sector is disposed closer to the first lateral edge and the first longitudinal edge of the second drainage sector and a second end of the second divider plate in the second drainage sector is disposed closer to the second lateral edge and the second longitudinal edge of the second drainage sector, whereby the second divider plates in the first drainage sector and the second drainage sector define diverging divider plates.

Such an exemplary rotary drum filter may further include at least three divider plates in each of the first drainage sector and the second drainage sector, wherein a third divider plate of the at least three divider plates in each drainage sector is longitudinally distally disposed from the first divider plate and the second divider plate in each drainage sector, wherein a first end of the third divider plate in the first drainage sector is disposed closer to the first lateral edge and the first longitudinal edge of the first drainage sector and a second end of the third divider plate in the first drainage sector is disposed closer to the second lateral edge and the second longitudinal edge of the first drainage sector, wherein a first end of the third divider plate in the second drainage sector is disposed closer to the second lateral edge and the first longitudinal edge of the second drainage sector and a second end of the third divider plate in the second drainage sector is disposed closer to the first lateral edge and the second longitudinal edge of the second drainage sector, whereby the third divider plates in the first drainage sector and the second drainage sector define converging divider plates.

Yet another exemplary rotary filter drum includes: a drum shell having areas defining a plurality of drainage holes, divider plates disposed on an outer surface of the drum shell and extending longitudinally and laterally along the drum shell along an upper section of an ascending drainage sector of the drum shell to a lower section of the ascending drainage sector of the drum shell, wherein the divider plate has a first end and a second end, and wherein the first end is disposed near a drainage hole and the second end is disposed near a drainage hole.

While the invention has been described in connection with what is presently considered the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. A rotary drum filter comprising:
   a rotatably mounted drum shell capable of being rotated through a slurry, the drum shell having an outer surface and a plurality of drainage holes extending through the outer surface;
   a plurality of grid holders extending longitudinally on and connected to the outer surface and around a circumference of the drum shell at arcuate, spaced intervals to define multiple arcuate drainage sectors, each grid holder having an end attached to the outer surface and a distal end;
   a plurality of divider plates extending diagonally between adjacent grid holders, and conforming to a curvature of the outer surface, dividing each arcuate drainage sector, into separate sections; each section including one or more drainage holes, the plurality of divider plates including at least two adjacent divider plates diagonally angled in opposing directions such that the two adjacent divider plates are capable of directing liquid on the outer surface towards the same, at least one drainage hole, as the rotatably mounted drum shell rotates;
   a plurality of grid segments, each grid segment extending between and connected to distal ends of adjacent grid holders, and disposed above a respective plurality of divider plates; and
   a filter medium, disposed around the drum shell, over the plurality of grid segments.

2. The rotary drum filter of claim 1, wherein, at least one of the plurality of grid holders is welded to the outer surface of the drum shell.

3. The rotary drum filter of claim 1, wherein, at least one of the plurality of grid holders includes at least one drainage slot extending along a length of the at least one grid holder.

4. The rotary drum filter of claim 1, wherein, at least one of the plurality of drainage holes is positioned substantially adjacent to at least one of the plurality of grid holders.

5. The rotary drum filter of claim 4, wherein, at least another one of the plurality of drainage holes is positioned substantially adjacent to the same at least one grid holders in an adjacent section of an adjacent arcuate drainage sector.

6. The rotary drum filter of claim 1, further comprising a rotary support structure disposed around a center axis of rotation and a central drainage channel, wherein an end of the central drainage channel is in fluid communication with a vacuum system, with drainage conduits placing the plurality of drainage holes and the central drainage channel in fluid communication.

7. The rotary drum filter of claim 1, wherein, an end of each of two or more of the plurality of divider plates are disposed adjacent to separate drainage holes.

8. The rotary drum filter of claim 1, wherein, the plurality of divider plates are disposed at an angle between about 25 degrees and 90 degrees relative to an adjacent grid holder.

9. The rotary drum filter of claim 1, wherein, at least one of the plurality of grid segments includes at least one grid leg that extends from a bottom of the at least one grid segment towards the outer surface of the drum shell.

* * * * *